C. R. FARGO AND P. O. UNGER.
LOOSE LEAF BINDER AND STAND THEREFOR.
APPLICATION FILED MAY 3, 1920.

1,422,950.

Patented July 18, 1922.
4 SHEETS—SHEET 1.

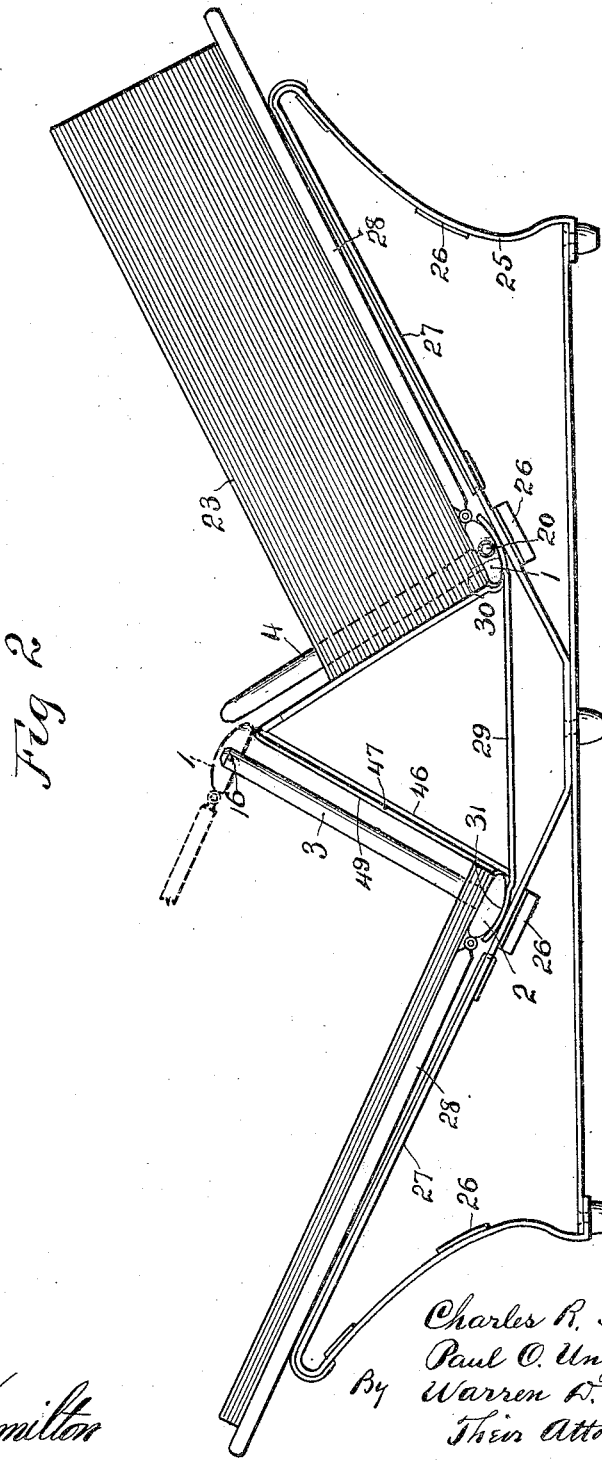

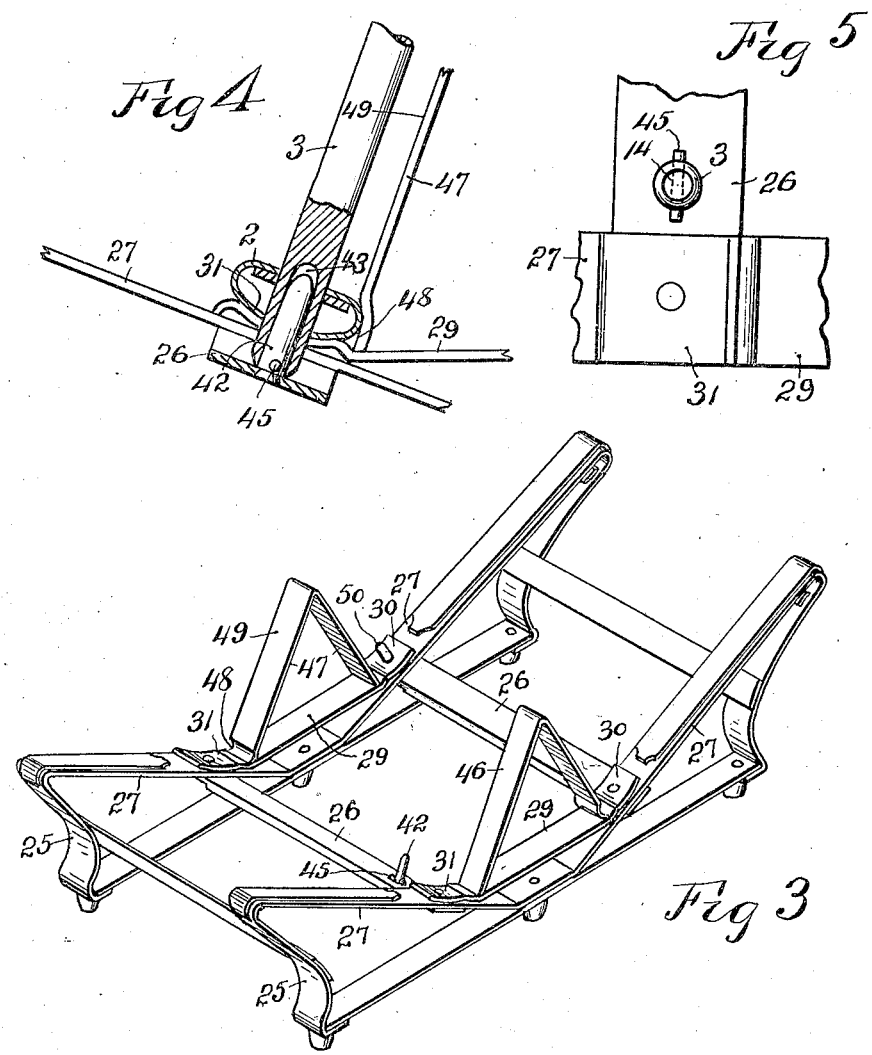
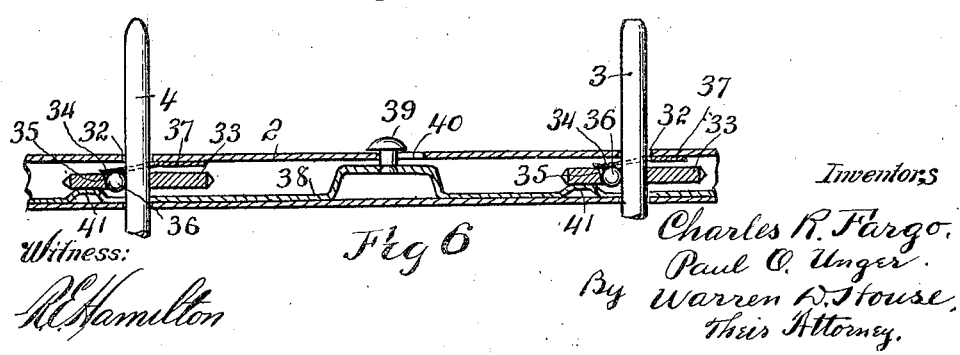

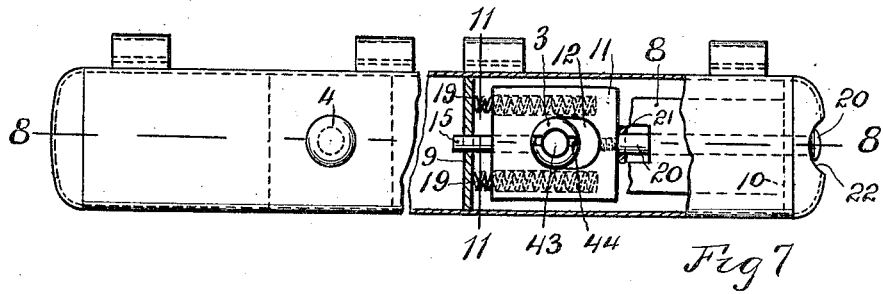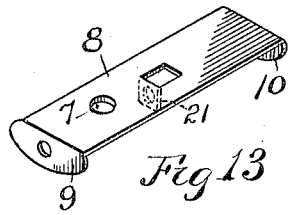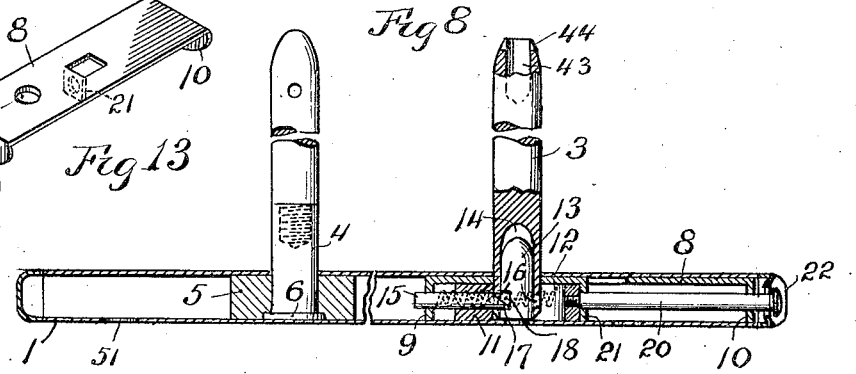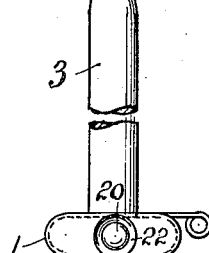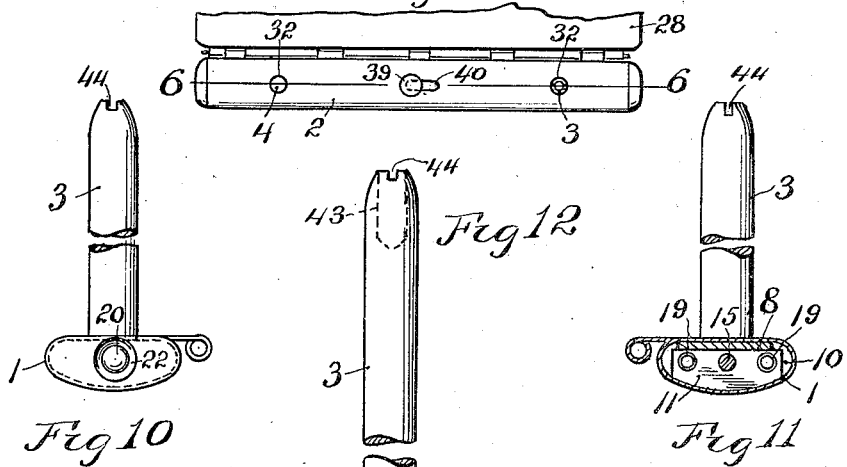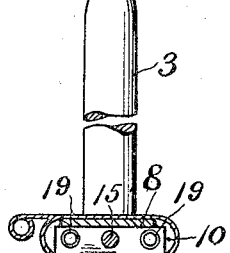

UNITED STATES PATENT OFFICE.

CHARLES R. FARGO AND PAUL O. UNGER, OF KANSAS CITY, MISSOURI, ASSIGNORS TO IRVING-PITT MANUFACTURING COMPANY, OF KANSAS CITY, MISSOURI, A CORPORATION OF MISSOURI.

LOOSE-LEAF BINDER AND STAND THEREFOR.

1,422,950.   Specification of Letters Patent.   Patented July 18, 1922.

Application filed May 3, 1920. Serial No. 378,352.

*To all whom it may concern:*

Be it known that we, CHARLES R. FARGO and PAUL O. UNGER, citizens of the United States, residing at Kansas City, in the county of Jackson and State of Missouri, have invented a certain new and useful Improvement in Loose-Leaf Binders and Stands Therefor, of which the following is a specification.

Our invention relates to improvements in loose leaf binders and stands therefor.

It relates particularly to loose leaf binders of the type having two leaf-carrying posts mounted on a leaf-clamping member, and on which a follower-clamping member is adapted to slide to and from a clamping position.

The object of our invention is to provide a novel stand or support on which the leaf-clamping members may be mounted in position for posting.

A further object of our invention is to provide a novel binder adapted for use with the stand in the posting operation, and with which the loose leaves may be easily and quickly transferred from one clamping member to the other in the posting operation.

Our invention provides further a detachable leaf-carrying post adapted to be detached from one clamping member and to be mounted in the posting position in the other clamping member.

Our invention provides still further a stand adapted to support the follower-clamping member in the posting position, and to support the detachable post in the posting position in the follower member. It provides further means for registering one set of edges of the loose leaves as they are filed on the detachable post in the posting operation.

The novel features of our invention are hereinafter fully described and claimed.

In the accompanying drawings which illustrate the preferred embodiment of our invention.

Fig. 2 is a side elevation of the same.

Fig. 3 is a perspective view of the stand.

Fig. 4 is an enlarged vertical sectional view of a portion of the stand and a part of the detachable post and follower member mounted thereon.

Fig. 5 is a top view of what is shown in Fig. 4,

Fig. 6 is a vertical sectional view on the line 6—6 of Fig. 9,

Fig. 7 is an enlarged top view of the lower leaf clamping member with post attached, partly broken away, and partly in horizontal section.

Fig. 8 is a vertical sectional view on the line 8—8 of Fig. 7.

Fig. 9 is a top view of the follower clamping member and a part of the cover attached thereto.

Fig. 10 is an end elevation, partly broken away, of the lower clamping member and of one of the posts.

Fig. 11 is a cross section on the line 11—11 of Fig. 7.

Fig. 12 is an elevation, partly broken away, of the detachable post.

Fig. 13 is a perspective view of the housing member which receives the detachable post.

Similar reference characters designate similar parts in the different views.

Figure 1:
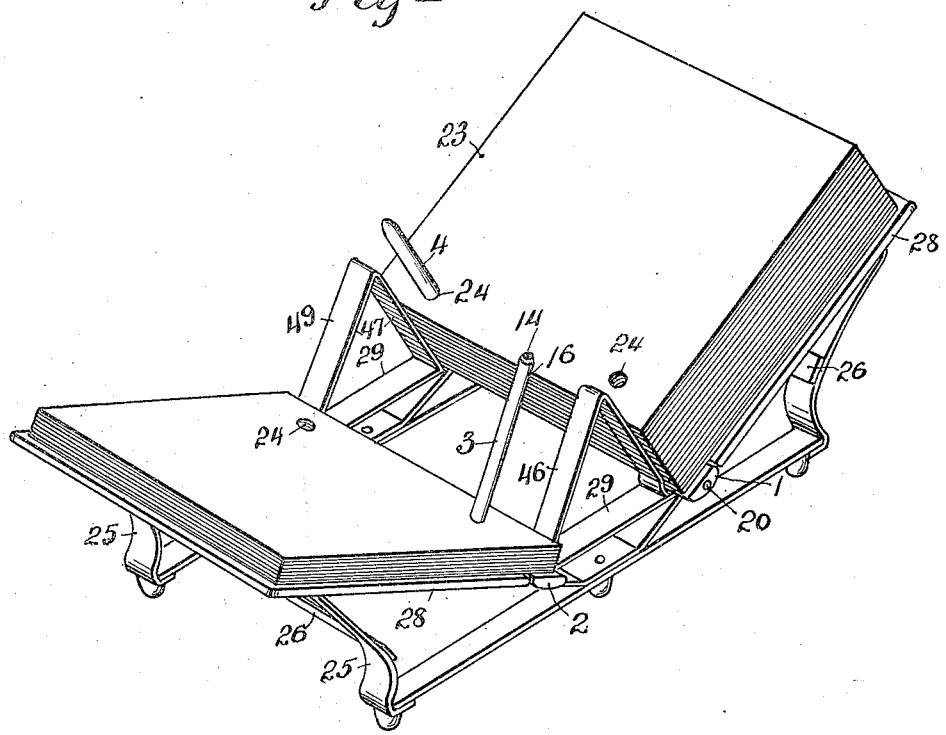
Fig. 1 is a perspective view of our improved binder and stand shown in the posting position.

The binder comprises a lower leaf-clamping member 1 and a follower leaf-clamping member 2.

The member 1 is a hollow body arranged to carry a detachable post 3 and a permanently attached post, comprising preferably a base section 4 having its lower end mounted in a block 5 which is located in the member 1. The lower end of the permanently secured post 4 is preferably provided with a peripheral flange 6 mounted in a corresponding recess in the under side of the block 5. The block 5 and post 4 may be rigidly attached to the member 1 in any desired manner, as by spot welding the lower end of the post 4 to the bottom portion of the member 1.

The post 4 may be provided with a plurality of sections adapted for screw-threaded connection with each other, for the purpose of changing the length of the post.

The detachable post 3 is adapted to have its lower end inserted through a hole provided in the upper side of the member 1 and through a hole 7 provided in a horizontal longitudinal housing member 8, Fig. 13, said housing member being provided with two downwardly extending end portions 9 and 10, which are fitted in the member 1, Fig. 8.

Mounted in the member 1 between the end portions 9 and 10 is a longitudinally slidable block 11, Figs. 7, 8 and 11, which is provided with a longitudinal slot 12, through which extends a vertical stud 13, which has its lower end rigidly secured to the bottom portion of the member 1 and which is adapted to be inserted in a longitudinal hole 14, provided in the lower end of the detachable post 3.

The post 3 is releasably locked to the member 1 by means of a longitudinal bolt 15, which is rigidly secured in the block 11 and which is slidably mounted in the portion 9 of the housing member 8. One end of the bolt 15 is adapted to enter a transverse hole 16 which is provided in one side of the detachable post 3, near the lower end thereof. Said end of the bolt 15 is provided on its upper side with a beveled portion 17, which is adapted to be struck by the beveled lower end of the post 3, whereby the bolt 15 and block 11 are forced inwardly when the post 3 is inserted in the member 1. The beveled end of the bolt 17 is also adapted to enter a transverse recess 18 in the side of the stud 13.

Two horizontal coil springs 19 are mounted respectively in holes provided therefor in one end of the block 11 at opposite sides respectively of the bolt 15. The tension of the springs 19 serves to normally force the block 11 to the locking position shown in Figs. 7 and 8, in which position the bolt 15 will be in the hole 16 of the post 3 and in the recess 18 in the stud 13.

For releasing the post 3 from the bolt 15, so that the post 3 may be detached, for purposes hereinafter set forth, the outer end of the block 11 has secured to it, preferably by screw-thread connection, the inner end of a horizontal manually operated push rod 20, which is longitudinally slidable in the portion 10 of the housing member 8 and in a downwardly extending tongue 21, Fig. 8, which is cut and depressed from the horizontal portion of the member 8. The outer end of the push rod 20 is provided with a head which is located in a depression 22 provided in the adjacent end of the member 1, said depression having a central hole in which is located the head of the push rod 20. By pressing inwardly on the head of the rod 20, the latter is moved inwardly, thus sliding the block 11 against the pressure of the springs 19 to a position in which the bolt 15 will clear the periphery of the post 3. The latter may then be withdrawn, upon which, when the rod 20 is released, the springs 19 will slide the block 11 and with it the bolt 15 to the locking position shown in Figs. 7 and 8. If now the post 3 be inserted into the member 1, and into the block 11, the beveled lower end of the post 3 will strike the beveled surface 17 of the bolt 15 and will force the latter to the unlocked position. When the post 3 is forced inwardly until its lower end strikes the bottom of the member 1, and the post 3 is disposed with the hole 16 adjacent to and in alinement with the bolt 15, the latter will be forced by the springs 19 into the hole 16, thereby securely locking the post 3 in operative position in the member 1. With the post 3 so mounted, loose leaves 23, Figs. 1 and 2, may be mounted in the usual manner on the posts 3 and 4, the leaves 23 being provided with the usual perforations 24, Fig. 1, for receiving the leaf carrying posts.

For the purpose of supporting the leaf clamping members 1 and 2, in operative posting position for carrying on the operation of posting, there is provided a stand comprising a frame, preferably of the W-type, which is provided with two vertical parallel side members 25, which are connected together by means of transverse bars 26, Fig. 3. Each side member 25 is provided with two outwardly flaring members 27 which are adapted to respectively support the usual covers 28 which are respectively hinged in the ordinary manner to the clamping members 1 and 2. A longitudinal plate 29 is mounted on each of the side members 25 and is supported and secured to the adjacent inclined portions 27 of the frame.

Each plate 29 adjacent to its ends is provided with two curved seats 30 and 31, Figs. 2 and 3. The two seats 30 are adapted to support the member 1 in the posting position, and the seats 31 are adapted to support in the posting position the clamping member 2. Fig. 2. The member 2 is provided with the usual two holes 32 adapted to receive therethrough the posts 3 and 4 upon which the member is adapted to slide to and from the clamping position. For holding the member 2 from sliding in one direction, that is from the member 1, any ordinary means may be provided. For this purpose there is illustrated in the drawings the following described mechanism.

Held rigidly in the member 2 are two blocks 33, Fig. 6, having respectively two vertical holes 34 adapted to receive respectively therethrough the posts 3 and 4, each block 33 having at one end of its hole 34 a beveled edge 35 against which rests a ball 36 which is adapted to bear and lock against the adjacent leaf carrying post. Two springs 37 attached to the member 2 respectively bear against the balls 36 for releasably forcing them to the locking position, shown in Fig. 6. Any movement of the member 2 away from the member 1 forces the balls tightly against the posts 3 and 4 and the inclined edges 35, thus holding the member 2 from such movement.

To release the member 2 from the posts 3 and 4 so that the member 2 may be slid from the clamping position, there is provided in the member 2 a longitudinal plate 38, which is slid to and from the locking position by means of a button 39 secured to the plate 38 and which extends through a slot 40 in the upper side of the member 2. The plate 38 is provided with two raised portions 41 adapted to simultaneously strike the lower sides respectively of the balls 36 and force them upwardly to the unlocked position, when the plate 38 is slid by means of the button 39 to the right, as viewed in Fig. 6, to the unlocked position.

In the posting operation, the member 2 is removed from the posts 3 and 4 and laid upside down on the seats 31 with the adjacent cover 28 resting on the adjacent inclined portion 27. Mounted in the adjacent bar 26 is an upwardly extending stud 42 which is adapted to enter one of the holes 32 of the member 2, when the latter is in the posting position on the seats 31, as shown in Figs. 1 and 2.

The member 1, carrying the leaves 23 to be posted, is mounted on the seats 30, the detachable post 3 being withdrawn from the member 1 and its upper end inserted into the hole 34 through which extends the stud 42. Said end of the post 3 is provided with a longitudinal hole 43 into which the stud 42 extends. The said end of the post 3 is adapted to rest upon and be supported by the adjacent bar 26 and is provided with a transverse notch 44 adapted to receive the end portions of a transverse pin 45 which is mounted in and extends beyond the sides of the stud 42. The pin 45 properly positions the post 3 in the clamping member 2.

The leaves 23 are then removed one by one from the member 1 and the post 4 and are transferred to the post 3 and onto the member 2, as the posting operation proceeds.

To hold the leaves on the posts 3 and 4 in proper position, there are provided two inverted V shaped members 46 and 47 mounted respectively on the side bars 29. The member 47 has at its outer side adjacent to its lower end a recess 48 adapted to receive the adjacent edge of the member 2. The arm of the member 47 having the recess 48 is provided with a guiding surface 49 above the recess 48, which serves to register the adjacent edges of the leaves which are mounted on the post 3, so that, after all the leaves have been transferred from the post 4 onto the post 3, the holes 24 in the leaves will register with the adjacent hole 32 of the member 2. The member 1 with its cover 28 is then inverted and placed in the position shown in dotted lines in Fig. 2, in which position, the post 4 will enter the adjacent holes 24 in the leaves, and the upper end of the post 3 will enter the adjacent hole in the member 1 and will be locked to the member 1 by means of the bolt 15, in the manner already described. The member 2 with the leaves thereon is then forced upwardly on the posts 3 and 4 until the leaves are tightly clamped between the members 1 and 2. The binder may then be removed entirely from the stand.

It is quite a slow and difficult operation to slip loose leaves from two posts, and it is also difficult and a slow operation to slip leaves onto two posts. By removing the post 3 from the member 1, the leaves may be readily removed from the post 4, and by having the post 3 set in the member 2 on the stud 42, the leaves which are removed from the post 4 may be easily and quickly slipped onto the post 3, the guiding surface 49 serving to register the leaves on the post 3 so that the post 4 will enter the adjacent holes 24 and the hole 32 in the member 2.

For holding the member 1 from sliding in the seats 30, one of these seats may be provided with an upwardly extending pin 50, Fig. 3, which is adapted to enter a hole 51, Fig. 8, in the under side of the clamping member 1.

We do not limit our invention to the structure shown and described, as many modifications, within the scope of the appended claims, may be made without departing from the spirit of our invention.

What we claim is:—

1. In a loose leaf binder, a leaf-clamping member, two straight posts, one permanently attached to the clamping member and the other having free ends one of which is adapted to detachably engage the clamping member thereto, and means for releasably locking the detachable post to the clamping member, substantially as set forth.

2. In a loose leaf binder, a leaf-clamping member, two straight posts, one permanently attached to the clamping member and the other having free ends, one of which is adapted to detachably engage the clamping member thereto, a bolt on the clamping member having means for being releasably locked to the detachable post, and means for normally forcing the bolt into locked engagement with the detachable post, substantially as set forth.

3. In a loose leaf binder, a leaf clamping member, two straight posts, one permanently attached to the clamping member and the other having free ends, one of which is adapted to detachably engage the clamping member, the detachable post having a transverse hole, a bolt movable on the clamping member into and out of said hole, a spring normally forcing the bolt into said hole, and manually operated means for forcing the bolt out of said hole, substantially as set forth.

4. In a loose leaf binder, a leaf-clamping member having a stud, two posts, one permanently and the other detachably engaged with the clamping member, the detachable post having in one end a hole adapted to receive said stud, and manually releasable means for locking the detachable post on said stud, substantially as set forth.

5. In a loose leaf binder, a leaf-clamping member having a stud, two posts, one permanently and the other detachably engaged with the clamping member, the detachable post having in one end a hole adapted to receive said stud and provided with a transverse hole, a bolt adapted to enter the transverse hole to lock the detachable post on said stud, means for forcing the bolt to the locking position, and manually operated means for forcing the bolt to the unlocked position, substantially as set forth.

6. In a loose leaf binder, a leaf-clamping member, two posts, one permanently and the other detachably engaged with the clamping member, means for releasably locking the detachable post to the clamping member, and a follower leaf-clamping member adapted for slidable movement on said posts and having releasable means for being held from movement on said posts away from the other clamping member, substantially as set forth.

7. In a loose leaf binder and stand therefor, a leaf-clamping member, two posts, one permanently and the other detachably engaged with the clamping member, means for releasably locking the detachable post to the clamping member, a follower leaf-clamping member adapted for sliding movement on said posts and having means for being releasably held from movement away from the other clamping member, and a stand adapted to support the follower clamping member and having means for engaging and supporting said detachable post, substantially as set forth.

8. In a loose leaf binder and stand therefor, a leaf-clamping member, two posts, one permanently and the other detachably engaged with the clamping member, means for releasably locking the detachable post to the clamping member, a follower leaf-clamping member adapted for sliding movement on said posts and having means for being releasably held from movement away from the other clamping member, and a stand adapted to support said clamping members and having means for engaging and supporting said detachable post when the latter is engaged with the follower clamping member, substantially as set forth.

9. In a loose leaf binder and stand therefor, a leaf-clamping member, a post adapted for slidable and removable engagement therewith, the clamping member having releasable means for being held from sliding movement in one direction on said post, and a stand adapted to support said clamping member and having means for detachably supporting said post in engagement with said clamping member, substantially as set forth.

10. In a loose leaf binder and stand therefor, a leaf-clamping member, a post adapted for slidable and removable engagement therewith and provided in one end with a longitudinal hole, the clamping member having releasable means for being held from sliding in one direction on said post, and a stand adapted to support said clamping member and provided with means for supporting releasably said post when the latter is engaged with said clamping member, and having a positioning stud adapted to enter said hole, substantially as set forth.

11. In a loose leaf binder and stand therefor, a leaf-clamping member, a post adapted for slidable and removable engagement therewith, the clamping member having releasable means for being held from sliding in one direction on said post, and a stand adapted to support said clamping member in a posting position and having means for detachably supporting said post engaged with said clamping member, and having means for registering one set of edges of loose leaves mounted on said post, substantially as set forth.

12. In a loose leaf binder and stand therefor, a leaf-clamping member, a post adapted for slidable and removable engagement therewith and provided in one end with a longitudinal hole, the clamping member having releasable means for being held from sliding in one direction on said post, and a stand adapted to support said clamping member in a posting position and provided with means for releasably supporting said post engaged with said clamping member and provided with a stud adapted to enter said hole to position said post, the stand having means for registering one set of edges of loose leaves mounted on said post, substantially as set forth.

13. In a loose leaf binder and stand therefor, a leaf-clamping member, a post detachably secured thereto, a follower leaf-clamping member adapted for slidable engagement on said post and having means for releasably being held from sliding in one direction on said post, and a stand adapted to support said clamping members in the posting position and having means for releasably supporting said post engaged with the follower clamping member, substantially as set forth.

14. In a loose leaf binder and stand therefor, a leaf clamping member, a post detachably secured thereto, a follower leaf-clamping member adapted for sliding movement on said post and having means for being releasably held from sliding in one direction on said post, and a stand adapted to support said clamping members in the posting position and having means for detachably supporting and operatively positioning said post in operative engagement with said follower clamping member, substantially as set forth.

15. In a loose leaf binder and stand therefor, a leaf-clamping member having a stud, a post having a longitudinal hole in each end, said stud being insertable in one of said holes, means for releasably locking the post to said stud, the post being detachable from the stud, and a binder member support having a stud adapted for removable insertion in the other hole of said post when the latter is detached from the clamping member, substantially as set forth.

16. In a loose leaf binder and stand therefor, a leaf-clamping member, two posts, one permanently secured to the clamping member, the other being detachably engaged with the clamping member and having in one end a longitudinal hole, means for releasably locking the detachable post to the clamping member, a follower leaf-clamping member adapted for sliding movement on said posts, and a stand adapted to support said clamping members in the posting positions and having a stud adapted for insertion into the hole in said post and arranged to operatively position the detachable post in the follower clamping member when the latter is in the posting position on the stand, substantially as set forth.

17. In a loose leaf binder, a leaf-clamping member, two posts, one permanently and the other detachably secured to the clamping member, and a follower leaf-clamping member adapted for sliding movement on said posts, substantially as set forth.

18. In a stand for a loose leaf binder, means for respectively supporting in the posting position two leaf-clamping members of a binder, and means for supporting and operatively positioning in one of said clamping members a detachable leaf-holding post, substantially as set forth.

19. In a stand for a loose leaf binder, a frame having means for supporting a leaf-clamping member in a posting position, the frame having positioning means adapted to support a leaf-carrying post detachably mounted in the clamping member, substantially as set forth.

20. In a stand for a loose leaf binder, a frame having means for supporting in a posting position a leaf-clamping member and provided with a post-positioning member adapted to enter a post hole in the clamping member, substantially as set forth.

21. In a stand for a loose leaf binder, a frame having means for supporting in a posting position a leaf-clamping member and a leaf-carrying post detachably mounted in the clamping member, and provided with a stud adapted to engage and position said post, substantially as set forth.

22. In a stand for a loose leaf binder, a frame having means for supporting in a posting position a leaf-clamping member and a leaf-carrying post mounted in said member, and having a stud for engaging and holding said post, the frame having means for registering one set of edges of loose leaves mounted on said member and said post, substantially as set forth.

23. In a loose leaf binder and stand therefor, a leaf-clamping member, a post adapted for being detachably mounted on said member, a follower leaf-clamping member adapted to slide on said post, and a stand having means for supporting in the posting position the follower clamping member and said post with the post mounted in the follower member and detached from the other clamping member, substantially as set forth.

24. In a loose leaf binder and stand therefor, a leaf-clamping member, two posts, one permanently and the other detachably mounted on the clamping member, a follower leaf-clamping member adapted to slide on said posts, and a stand having means for supporting the follower clamping member and the detachable post in the posting position, when the detachable post is mounted in the follower clamping member and is detached from the other clamping member, substantially as set forth.

In testimony whereof we have signed our names to this specification.

CHARLES R. FARGO.
PAUL O. UNGER.